(12) United States Patent
Boss et al.

(10) Patent No.: US 8,352,092 B2
(45) Date of Patent: Jan. 8, 2013

(54) METHOD AND SYSTEM FOR WORKLOAD BALANCING TO ASSIST IN POWER GRID LOAD MANAGEMENT

(75) Inventors: Gregory Jensen Boss, Saginaw, MI (US); Rick Allen Hamilton, II, Charlottesville, VA (US); Julianne Frances Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 12/619,746

(22) Filed: Nov. 17, 2009

(65) Prior Publication Data

US 2011/0118862 A1 May 19, 2011

(51) Int. Cl.
*H02P 11/00* (2006.01)
*G05D 5/00* (2006.01)

(52) U.S. Cl. ........ 700/295; 363/165; 700/291; 700/292; 700/297

(58) Field of Classification Search .................. 363/165; 700/291, 295, 292, 297; 365/165
See application file for complete search history.

(56) References Cited

U.S. PATENT DOCUMENTS

| | | | |
|---|---|---|---|
| 4,761,563 A | | 8/1988 | Ross et al. |
| 5,442,335 A * | | 8/1995 | Cantin et al. ............... 340/13.22 |
| 6,111,767 A * | | 8/2000 | Handleman ................... 363/95 |
| 7,031,998 B2 | | 4/2006 | Archbold et al. |
| 7,102,334 B2 * | | 9/2006 | Wiegand et al. ............... 323/223 |
| 7,490,013 B2 * | | 2/2009 | Wells .............................. 702/60 |
| 7,519,454 B2 | | 4/2009 | Gardner et al. |
| 7,557,464 B2 | | 7/2009 | Wang et al. |
| 7,571,028 B2 | | 8/2009 | Lapinski et al. |
| 2004/0010350 A1 * | | 1/2004 | Lof et al. ....................... 700/292 |
| 2006/0229768 A1 | | 10/2006 | Chassin et al. |
| 2006/0279088 A1 * | | 12/2006 | Miller et al. .................... 290/44 |
| 2007/0100506 A1 * | | 5/2007 | Teichmann ..................... 700/297 |
| 2007/0140847 A1 * | | 6/2007 | Martinez De Lizarduy Romo et al. ............................... 416/11 |
| 2007/0290506 A1 * | | 12/2007 | Walling .......................... 290/44 |
| 2008/0052145 A1 | | 2/2008 | Kaplan et al. |
| 2008/0077368 A1 | | 3/2008 | Nasle et al. |
| 2010/0138066 A1 * | | 6/2010 | Kong ............................. 700/295 |
| 2010/0280774 A1 * | | 11/2010 | Ewing et al. .................... 702/60 |
| 2011/0115301 A1 * | | 5/2011 | Bhavaraju et al. ............... 307/86 |

OTHER PUBLICATIONS

Fujita et al., "Dynamic Characteristic of Frequency Control by Rotary Frequency Converter to Link Wind Farm and Power System", IEEE, 2003, 6 pages.*

* cited by examiner

*Primary Examiner* — John R. Cottingham
*Assistant Examiner* — Thomas Stevens
(74) *Attorney, Agent, or Firm* — Schmeiser, Olsen & Watts; Anna Linne (57) ABSTRACT

A method and system for workload balancing to assist in power grid load management. The method includes receiving a request to perform a task at a site powered by connection to an AC power grid, the task comprising either data processing or manufacturing an article; measuring an AC frequency of the AC power grid to obtain a current AC frequency; and performing or not performing the task at the site based on the current AC frequency.

20 Claims, 6 Drawing Sheets

METHOD AND SYSTEM FOR WORKLOAD BALANCING TO ASSIST IN POWER GRID LOAD MANAGEMENT

FIELD OF THE INVENTION

The present invention relates to the field of power grid management; more specifically, it relates to a method and system for workload balancing to assist in power grid management.

BACKGROUND

Currently, electric power providers must constantly add and remove power generation capacity to match real-time demand. This power supply/demand balancing requires bringing on and off line auxiliary generating facilities. This process not only increases the costs of generating power, but provides little incentive for power conservation. Accordingly, there exists a need in the art to mitigate the deficiencies and limitations described hereinabove.

SUMMARY

A first aspect of the present invention is a method, comprising: receiving a request to perform a task at a site powered by connection to an AC power grid, the task comprising either data processing or manufacturing an article; measuring an AC frequency of the AC power grid to obtain a current AC frequency; and performing or not performing the task at the site based on the current AC frequency.

A second aspect of the present invention is a method, comprising: receiving a request to perform a task at a site powered by connection to an AC power grid, the task either comprising data processing or manufacturing an article; periodically measuring an AC frequency of the AC power grid to obtain a current AC frequency; starting the task at the site on a computer system or a manufacturing tool connected to the AC power grid when the current AC frequency is equal to or greater than a threshold AC frequency; and after the receiving a request to perform a task, the periodically measuring an AC frequency of the AC power grid and the starting the task at the site, then periodically measuring an AC frequency of the AC power grid to obtain a periodic AC frequency and if the periodic AC frequency is lower than the threshold AC frequency then stopping the task and restarting the task from where the task was stopped when the periodic AC frequency is again greater than the threshold AC frequency.

A third aspect of the present invention is a computer system comprising a processor, an address/data bus coupled to the processor, and a computer-readable memory unit coupled to communicate with the processor, the memory unit containing instructions that when executed by the processor implement a method for workload balancing to assist in power grid load management, the method comprising the computer implemented steps of: receiving a request to perform a task at a site powered by connection to an AC power grid, the task comprising either data processing or manufacturing an article; determining a current AC frequency of the AC power grid from frequency measurements of the AC power grid; and issuing instructions to perform or not perform the task at the site based on the current AC frequency.

A fourth aspect of the present invention is a computer system comprising a processor, an address/data bus coupled to the processor, and a computer-readable memory unit coupled to communicate with the processor, the memory unit containing instructions that when executed by the processor implement a method for workload balancing to assist in power grid load management, the method comprising the computer implemented steps of: receiving a request to perform a task at a site powered by connection to an AC power grid, the task either comprising data processing or manufacturing an article; periodically determining a current AC frequency of the AC power grid based on frequency measurements of the AC power grid; issuing instructions to start the task at the site on a computer system or a manufacturing tool connected to the AC power grid when the current AC frequency is equal to or greater than a threshold AC frequency; and after the receiving a request to perform a task, the periodically measuring an AC frequency of the AC power grid and the starting the task at the site, then periodically measuring an AC frequency of the AC power grid to obtain a periodic AC frequency and if the periodic AC frequency is lower than the threshold AC frequency then stopping the task and restarting the task from where the task was stopped when the periodic AC frequency is again greater than the threshold AC frequency.

These and other aspects of the invention are described below.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

The direction of alternating current periodically changes and results in a sinusoidal change of voltage from a maximum positive value to a minimum negative value over time. Thus, the frequency of AC power can be defined on a plot of voltage versus angular frequency the number of angular frequency cycles (0 to 360 degrees) per unit of time and the usual unit of measurement is Hertz, also commonly cycles/second, often shorted to cycles. AC power grids are designed to run most efficiently at a nominal frequency. In one example, the nominal operating frequency of an AC power grid is 60 Hz. In one example, the nominal operating frequency of an AC power grid is 50 Hz. The AC power grids of interest in the present invention are those bulk electrical transfer networks and sub-networks for transferring electricity from commercial power generating stations to consumers, such a households and businesses and factories. In one example, an AC power grid comprises a main power plant, an optional auxiliary power plant, and transmission lines.

As power demand (e.g., power consumption or load) increases on an AC power grid, the frequency decreases. In order to increase the frequency, either an increase in power generation or decrease in demand is required. Power generation can be increased by running main plants at higher output or bringing auxiliary power plants on line. Increasing the output of main power plants increases the maintenance costs and decreases the life of the plant, resulting in increased costs. Bringing auxiliary power plants online increase costs because auxiliary power plants often use fuels that are more expensive and/or are less efficient and thus more costly per unit of energy generated. As power demand decreases on an AC power grid, the frequency increases. In order to decrease the frequency, either a decrease in power generation or increase in demand is required. The methods and systems of the present invention utilize changes in frequency in the power grid to as a workload management tool to assist in keeping the frequency of the power grid at or close to nominal.

Figure 1:
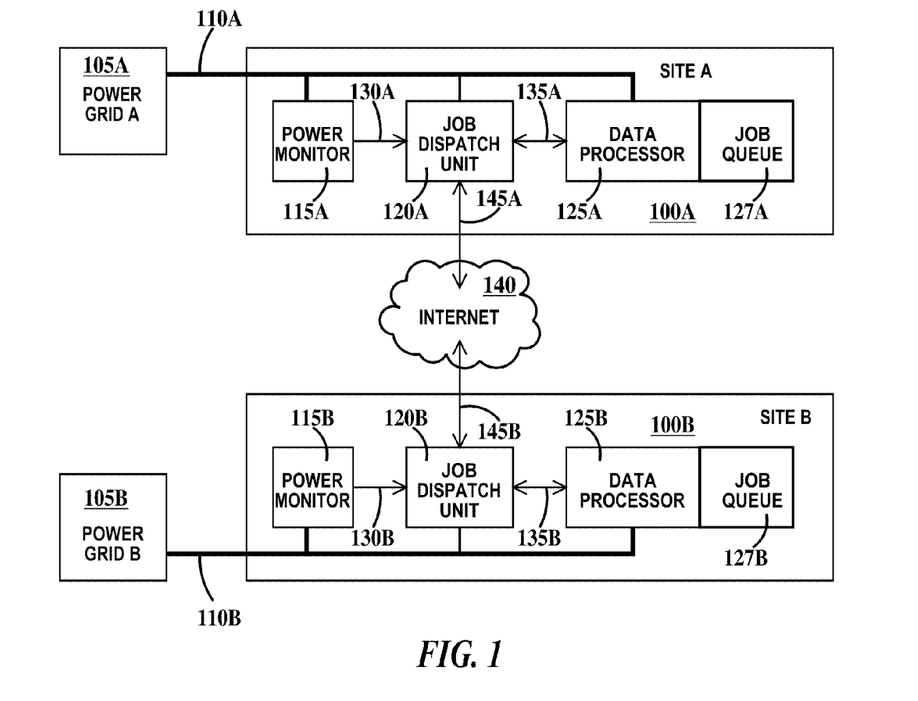
FIG. 1 a diagram illustrating an exemplary pair of linked data processing facilities linked to different power grids according to an embodiment of the present invention.

FIG. 1 a diagram illustrating an exemplary pair of linked data processing facilities linked to different power grids according to an embodiment of the present invention. In FIG. 1, a first data processing site 100A (site A) is connected to a first power grid 105A (power grid A) via an incoming power line 110A. First data processing site 100A includes a power monitor 115A, a job dispatch unit 120A and a data processor 125A, which includes a job queue 127A. Power monitor 115A and data processor 125A are connected to incoming power line 110A. Job dispatch unit 120A is also connected to incoming power line 110A, but generally consumes a far less amount of power compared to data processor 125A. Power monitor 125A monitors the AC frequency of on incoming power line and transmits a control signal 130A to job dispatch unit 120A. Job dispatch unit 120A communicates with data processor 125A via data transmission lines 135A.

Also in FIG. 1, a second data processing site 100B (site B) is connected to a second power grid 105B (power grid B) via an incoming power line 110B. First and second power grids 105A and 105B are sufficiently electrically isolated from each other so a change in AC frequency on one does not affect the AC frequency on the other. Second data processing site 100B includes a power monitor 115B, a job dispatch unit 120B and a data processor 125B, which includes a job queue 127B. Power monitor 115B and data processor 125B are connected to incoming power line 110B. Job dispatch unit 120B is also connected to incoming power line 110B, but generally consumes a far less amount of power compared to data processor 125B. Power monitor 125B monitors the AC frequency of an incoming power line and transmits a control signal 130B to job dispatch unit 120B. Job dispatch unit 120B communicates with data processor 125B via data transmission lines 135B.

While two sites 100A and 100B are illustrated in FIG. 1, there may be more than two sites linked together communications wise. The only requirement is that the different sites can perform at least some of the same job processing and be equipped with similar power monitors and similar and compatible job dispatch units. However the sites do not all need to be linked in the same way. For example, a first and second site could be linked via the Internet and a third site linked to the first and second sites by a private network. Additionally, sites may have multiple linkages to each other with one linkage for exchanging logistics data and another, more secure linkage for transferring the actual jobs to be processed.

The types of work data processors 125A and 125B can perform involve data processing on computer systems. Examples of data processing include processing banking and securities transactions, generating and/or mailing billing statements, generating and/or mailing account statements, processing requests for information on servers (e.g., search engines), catalog look-up or technical reference lookup. When jobs are not being run, the data processor, which may include data storage units, displays, incidental mechanical systems such as printers and envelope stuffers, and other devices does not consume as much power as when processing. Alternatively, the data processor can be turned off.

In one example, job dispatch units 120A and 120B may be software applications running on general-purpose computers. In one example, data processors 125A and 125B may be software applications running on general-purpose computers.

Figure 4:
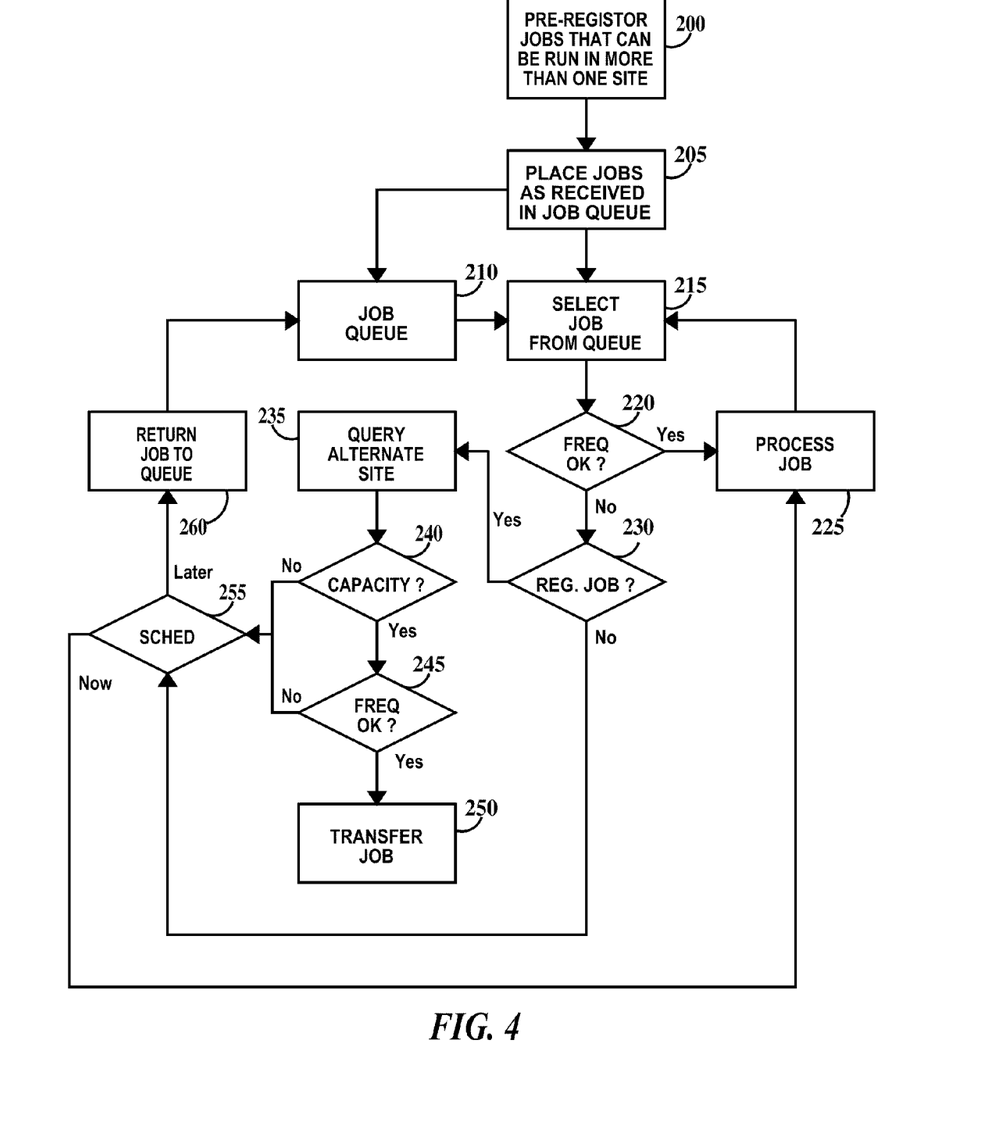
FIG. 4 is a flow diagram illustrating a first method of workload balancing for power grid management according to embodiments of the present invention.
Figure 5:
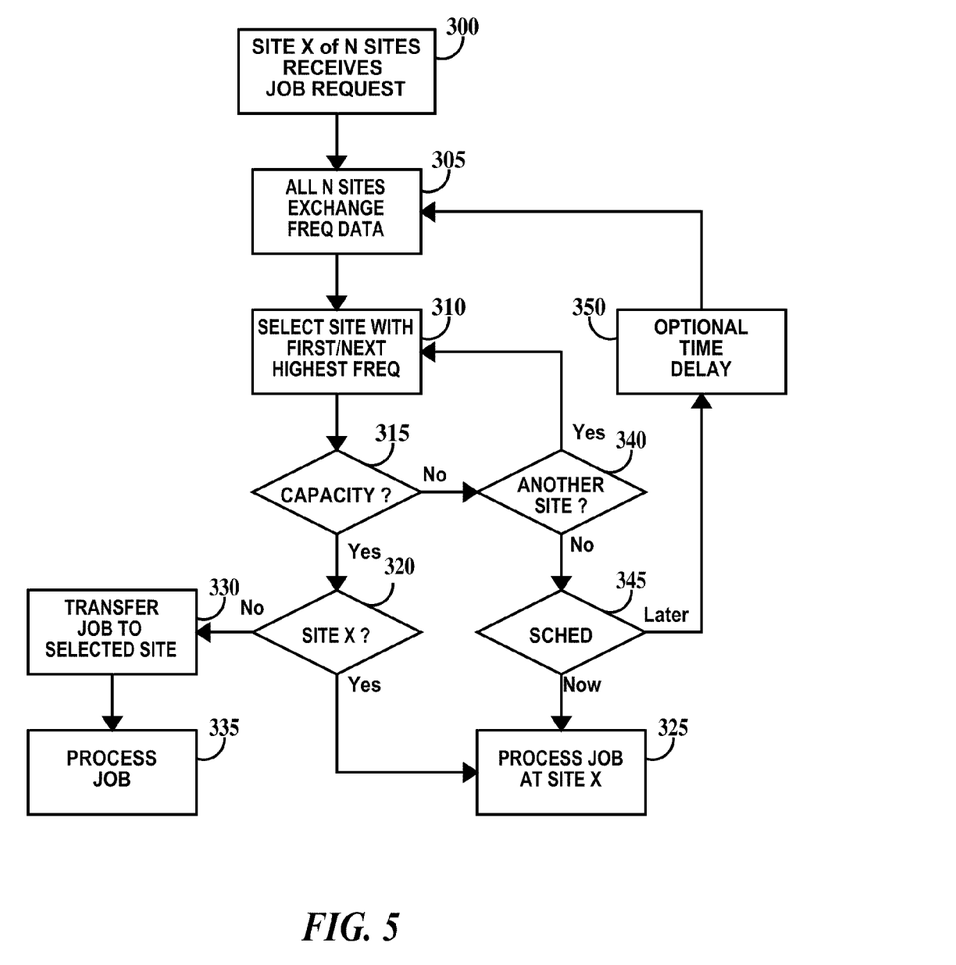
FIG. 5 is a flow diagram illustrating a second method of workload balancing for power grid management according to embodiments of the present invention.
Figure 6:
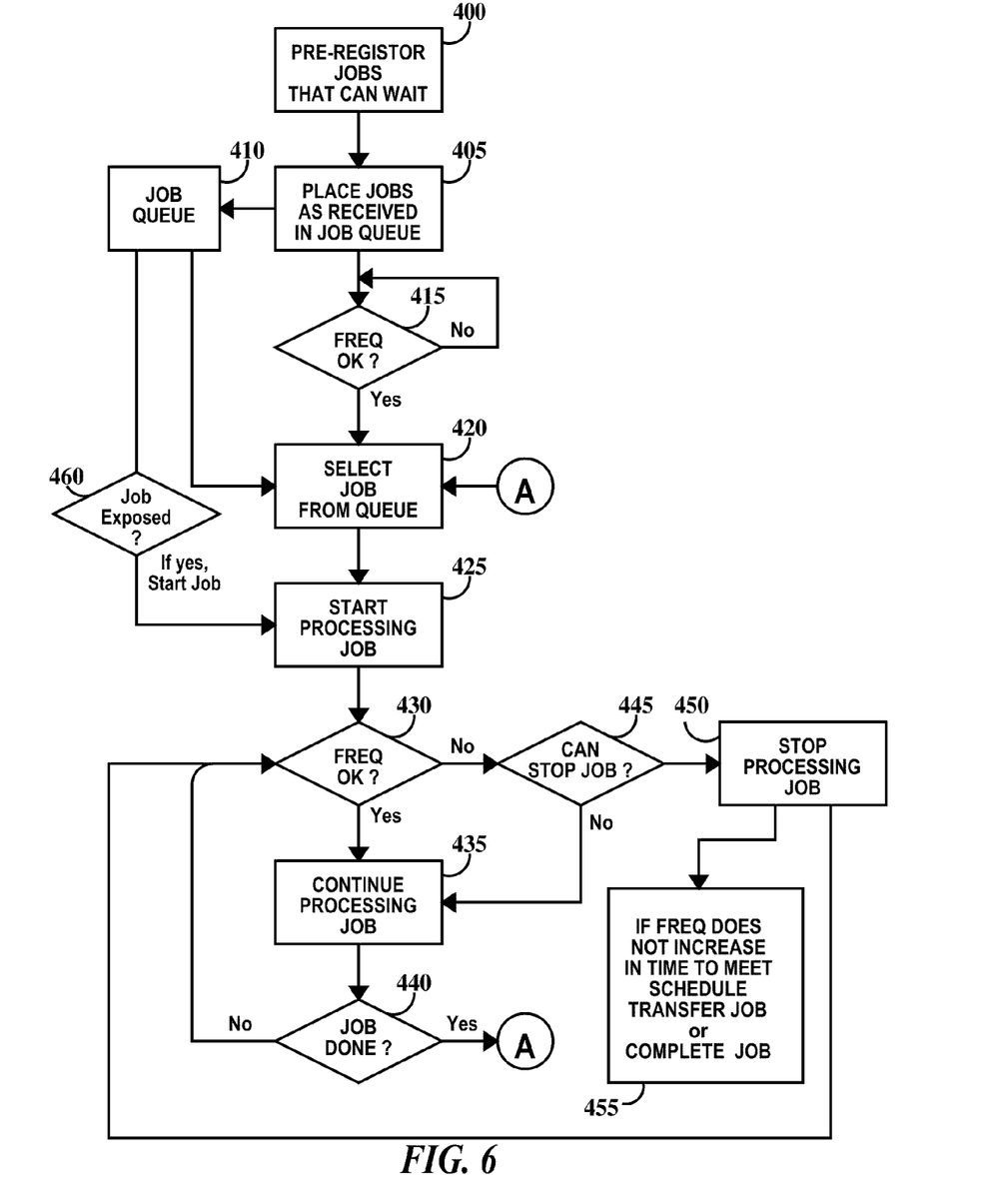
FIG. 6 is a flow diagram illustrating a third method of workload balancing for power grid management according to embodiments of the present invention.

The nature of the communications between job dispatch unit 120A and job dispatch unit 120B is described in detail infra with respect to FIGS. 4, 5 and 6, but generally involves information for deciding to process jobs at site A or site B based on capability to perform the processing, capacity and AC frequency at the respective sites. The communications also include the issuing of related instructions.

Job dispatch unit 120A is connected to the Internet 140 by link 145A. Job dispatch unit 120B is connected to the Internet 140 by link 145B. The links 145A and 145B may be public or virtual private network connections. Alternatively, the two job dispatch units 120A and 120B may be connected directly via a wired or wireless telephone connection or by a wired or wireless private network. This connection allows the two sites to exchange frequency information, workload information and if necessary, to transfer the actual work and issue instructions.

Figure 2:
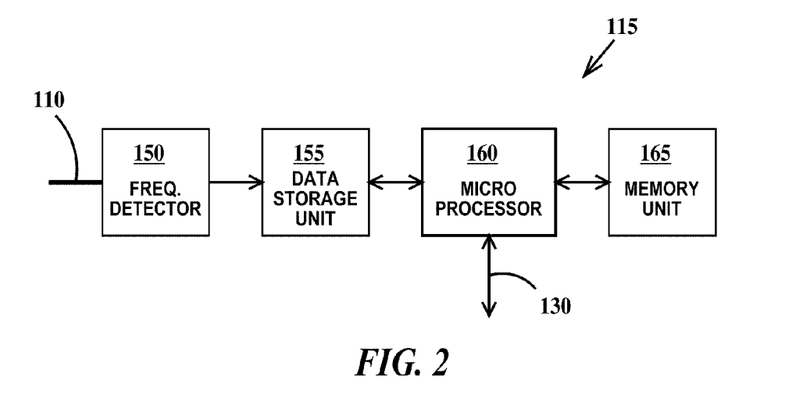
FIG. 2 is a diagram of an exemplary power-monitoring device according to the present invention.

FIG. 2 is a diagram of an exemplary power-monitoring device according to the present invention. In FIG. 2, power monitor 115 includes a frequency detector 150, an optional data storage unit 155, a microprocessor 160 and an optional memory unit 165. Power monitor 115 represents power monitors 115A and 115B of FIG. 1 and power monitors 115C and 115D of FIG. 3. Frequency detector 150 is connected to an incoming power line 110 and monitors the frequency of incoming power line 110. This information is passed to data storage unit 155 and then to microprocessor 160 (or directly to microprocessor 160) which generated a control signal 130 which includes information that a job dispatch unit such as job dispatch units 120A and 120B of FIG. 1 can use. In one example, power monitor 115 will sample the AC frequency over a selected time range and transmit that information. In one example, power monitor 115 will sample the AC frequency over a selected time range, analyze the data and then generate a signal indicating the frequency is too low process jobs or is high enough to process jobs.

Alternatively, it is possible to incorporate the functions of data storage unit 155, microprocessor 160 and memory unit 165 into a job dispatch unit such as job dispatch units 120A and 120B of FIG. 1. Alternatively, data storage unit 155, microprocessor 160 and memory unit 165 may be components of a general-purpose computer.

Figure 3:
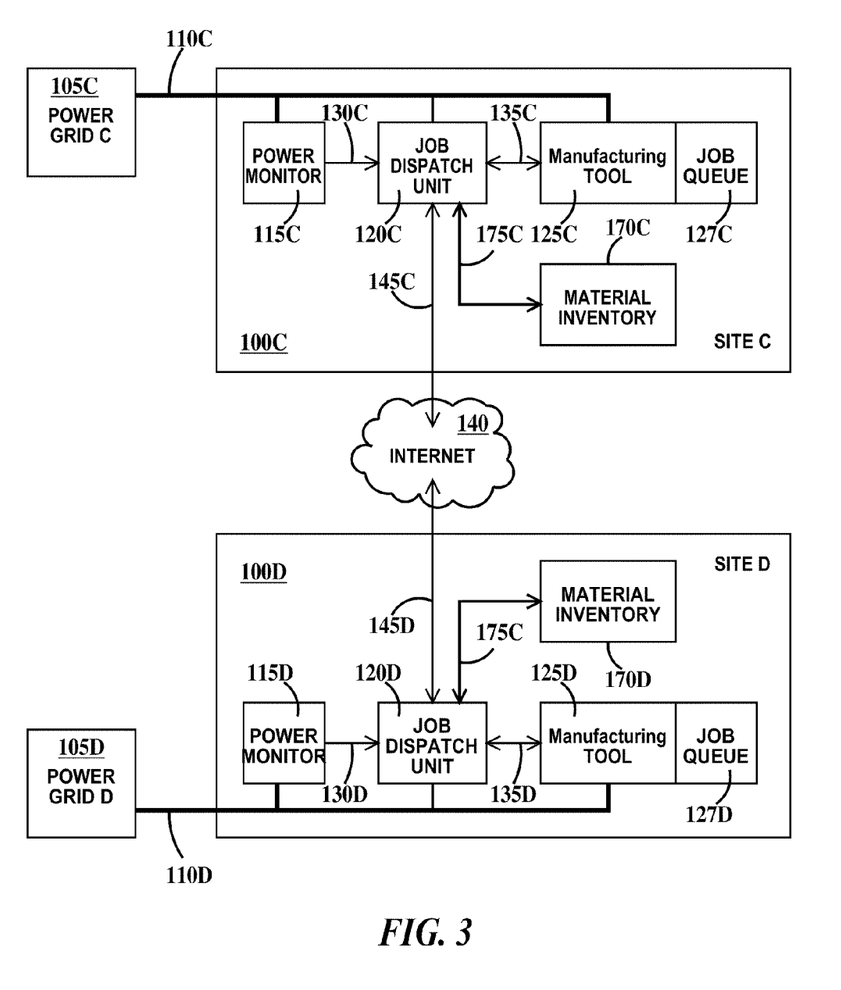
FIG. 3 is a diagram illustrating an exemplary pair of linked manufacturing facilities linked to different power grids according to an embodiment of the present invention.

FIG. 3 is a diagram illustrating an exemplary pair of linked manufacturing facilities linked to different power grids according to an embodiment of the present invention. In FIG. 3, a first manufacturing site 100C (site C) is connected to a first power grid 105C (power grid C) via an incoming power line 110C. First manufacturing site 100C includes a power monitor 115C, a job dispatch unit 120C and manufacturing tool 125C which includes a job queue 127C. First manufacturing site 100C also includes a material inventory 170C.

Power monitor 115C and manufacturing tool 125C are connected to incoming power line 110C. Job dispatch unit 120C is also connected to incoming power line 110C, but generally consumes a far less amount of power compared to manufacturing tool 125C. Power monitor 125C monitors the AC frequency of on incoming power line and transmits a control signal 130C to job dispatch unit 120C. Job dispatch unit 120C communicates with manufacturing tool 125C via data transmission lines 135C and material inventory via data transmission lines 175C.

Also in FIG. 3, a second manufacturing site 100D (site D) is connected to a second power grid 105D (power grid D) via an incoming power line 110D. Second manufacturing site 100D includes a power monitor 115D, a job dispatch unit 120D, a manufacturing tool 125C, which includes a job queue 127D. Second manufacturing site 100C also includes a material inventory 170D. Power monitor 115D and manufacturing tool 125D are connected to incoming power line 110D. Job dispatch unit 120D is also connected to incoming power line 110D, but generally consumes a far less amount of power compared to manufacturing tool 125D. Power monitor 125D monitors the AC frequency of on incoming power line and transmits a control signal 130D to job dispatch unit 120D. Job dispatch unit 120D communicates with manufacturing tool 125D via data transmission lines 135D and material inventory 170D via data transmission lines 175D.

While two sites 100C and 100D are illustrated in FIG. 1, there may be more than two sites linked together communications wise. The only requirement is that the different sites can manufacture at least some of the same article(s) and be equipped with similar power monitors and similar and compatible job dispatch units. However the sites do not all need to be linked in the same way. For example, a first and second site could be linked via the Internet and a third site linked to the first and second sites by a private network. Additionally, sites may have multiple linkages to each other with one linkage for exchanging logistics data and another, more secure linkage for transferring the actual jobs to be processed.

The articles that manufacturing tools 125C and 125D can fabricate is limited only by the cost of duplicating capabilities. Thus, this embodiment of the present invention can be applied to almost any manufactured article.

In one example, job dispatch units 120C and 120D may be software applications running on general-purpose computers.

The nature of the communications between job dispatch unit 120C and job dispatch unit 120D is described in detail infra with respect to FIGS. 4, 5 and 6, but generally involves information for deciding to manufacture an article at site C or site D based on capability to manufacture the article, capacity, material inventory and AC frequency at the respective sites. The communications also include the issuing of related instructions.

Job dispatch unit 120C is connected to the Internet 140 by link 145C. Job dispatch unit 120D is connected to the Internet 140 by link 145D. The links 145C and 145D may be public or virtual private network connections. Alternatively, the two job dispatch units 120C and 120D may be connected directly via a wired or wireless telephone connection or by a wired or wireless private network. This connection allows the two sites to exchange frequency information, workload information, inventory information and if necessary, to transfer the order.

A task is defined as either a request to perform a data processing job or a request (e.g., order for) to manufacture and article. In FIGs, 3, 4 and 5, a job is either a processing job as performed by the sites of FIG. 1 or an article of manufacture as in the sites of FIG. 3. In FIGS. 3 and 4, performing or not performing a task at a site is based on the current AC frequency. In FIG. 6, selecting a site for a task to be performed at is based on the current AC frequency of each site.

FIG. 4 is a flow diagram illustrating a first method of workload balancing for power grid management according to embodiments of the present invention. In optional step 200, jobs that can be run at more than one site and the alternate site(s) are identified and registered with job dispatch units at one or multiple sites. In one example, registering comprises placing an identifier (e.g., job number) on a list. In step 205, as jobs are received by a receiving site the jobs are placed in a job queue 210 but not started. In step 215, a job is selected from the job queue. In one example, job selection is based on a scheduled completion date/time. If there is no job in job queue 210 the method waits until there is a job in the job queue. In step 220, it is determined if a current (i.e., most recently measured) AC frequency is higher than a threshold AC frequency. If the current AC frequency is higher (or alliteratively equal to) the threshold AC frequency the method proceeds to step 225 otherwise to step 230. For example, if the nominal frequency is 60 Hz, the threshold AC frequency is 59.95 Hz and the current AC frequency is 59.97 Hz, which is equal to or greater than the threshold AC frequency, then the method can proceed to step 225. In another example, if the nominal frequency is 60 Hz, the threshold AC frequency is 59.95 Hz and the current AC frequency is 59.93 Hz, which is less than the threshold AC frequency, then the job cannot be started and the method proceeds to step 230. The threshold AC frequency can be greater, less than or the same as the nominal frequency. Alternatively, when the current AC frequency is the same as the threshold AC frequency the method could proceed to step 230 rather than step 225. In step 225, the selected job is processed and the method loops back to step 215. The term "job is processed" is defined as processing a job on a computer system or manufacturing an article on a manufacturing tool(s).

Returning to step 230, in step 230 it is determined if the selected job is a registered job (a job that can be performed at an alternate site) or otherwise identified as a job that can be performed at an alternate site. If so the method proceeds to step 235. In step 235, the alternate site is contacted and queried. In step 240, the alternate site is queried as to sufficient capacity to process the selected job to meet a scheduled completion date/time. If the response in step 240 is affirmative, the process proceeds to step 245. In step 245, the alternate site is queried as whether the AC frequency at the alternate site is acceptable to process the selected job. If the response in step 245 is affirmative, then in step 250, the selected job is transferred to the alternate site and is ultimately processed at the alternate site. Transferring a job includes transferring all necessary data, specifications and processing instructions from the receiving site to the alternate site. If in step 230, the selected job is not a registered job (or one that cannot be processed at the alternate site) or if in steps 240 or 245, the response from the alternate site was negative, then the method proceeds to step 255. In step 255, it is determined if the selected job needs to be released for processing to meet the scheduled completion date/time. The term "released for processing" includes (i) starting the job immediately, (ii) starting the job as soon as a data processor or manufacturing tool is available and (iii) placing the job in any in-line queue at the data processor or manufacturing tool (as opposed to the job queue 210). In case (iii), the job queue may be organized by first-in-first-out (FIFO) or job priority. If the selected job can be processed later and then the method proceeds to step 260 where the selected job is returned to queue. If the selected job needs to be processed now to meet the scheduled completion date/time then the method proceeds to step 225 where the selected job is processed by the receiving site.

If there is more than one alternate site, then steps 235, 240 and 245 are repeated until a site is found than can accept the job or until all sites have been queried. Steps 200, 205, 215, 220, 230, 235, 240, 245, 250, 255 and 260 are performed by or have instructions to do the action issued by the job dispatch unit. Step 215 may include procedures to not to select a particular job returned to queue until a predetermined interval of time has elapsed since the particular job was last selected.

FIG. 5 is a flow diagram illustrating a second method of workload balancing for power grid management according to embodiments of the present invention. In step 300, a site X of N sites where N is an integer equal to or greater than 2 receives a job request. All N of the N sites are capable of processing the job request and are on different AC power grids. In step 305, all N sites exchange data describing the current AC frequency of the AC power at the sites. Next in step 310, site X determines which site has the highest AC frequency or has the greatest positive difference when the nominal AC frequency is subtracted from the current AC frequency. For example, a first site has a nominal AC frequency of 60 Hz and a current AC frequency of 60.05 for a difference of positive 0.05 Hz. A second site has a nominal AC frequency of 60 Hz and a current AC frequency of 60.02 for a difference of positive 0.02 Hz. Thus, the first site is chosen because positive 0.05 is more positive than positive 0.02. It is possible for the greatest AC frequency to be lower than the nominal frequency. For example, a first site has a nominal AC frequency of 60 Hz and a current AC frequency of 59.95 for a difference of negative 0.05 Hz. A second site has a nominal AC frequency of 60 Hz and a current AC frequency of 59.93 for a difference of negative 0.07 Hz. Thus, the first site is chosen, (because negative 0.5 is more positive than negative 0.7) even though the current AC frequency at the first site is below nominal.

In step 315, the selected site is queried for capacity to perform the job request. If in step 315, the selected site does have the capacity (capacity includes materials and ability to meet a scheduled completion date/time), the method proceeds to step 320. In step 320, it is determined of the selected site is site X (the receiving site) and in step 325 the job is processed by the receiving site. However, if in step 320, the selected site is not site X, then in step 330, the job is transferred to the selected site and the selected site processes the job. Transferring a job includes transferring all necessary data, specifications and processing instructions from the receiving site to the alternate site.

Returning to step 315, if the selected site does not have the capacity, then the method proceeds to step 340. In step 340, it is determined if there is another site to be queried. If there is another site the method loops back to step 310, otherwise the method proceeds to step 345. In step 345, it is determined if the selected job needs to be released for processing to meet the scheduled completion date/time. If the selected job can be processed later and then the method proceeds to optional step 350 where a predetermined time delay is imposed before looping back to step 305. If the selected job needs to be released to meet the scheduled completion date/time then the method proceeds to step 325. Steps 300 through 345 are repeated for each job in the queue of site X. Steps 300 through 345 may be performed by each of the N sites for tasks received by each site of the N sites.

Unlike the methods of FIGS. 4 and 5, only one site is required to perform the method of FIG. 6, thus the communication links between multiple sites illustrated in FIGS. 1 and 3 is not required, but may still be present to allow any two or all three of the methods of respective FIGS. 4, 5 and 6 to be performed in combination FIG. 6 is a flow diagram illustrating a third method of workload balancing for power grid management according to embodiments of the present invention. In optional step 400, jobs that can wait, do not need to be released for processing to meet scheduled completion date/times are registered. In step 405, jobs received are placed in job queue 410. In step 415, it is determined if the current AC frequency is higher than a threshold AC frequency. If the current AC frequency is higher (or alternatively equal to) the threshold AC frequency the method proceeds to step 420 otherwise loops back on itself. Step 415 is performed at a predetermined AC frequency-sampling rate. In step 420, a job is selected from job queue 410. In one example, job selection is based on a scheduled completion date/time (e.g., date and time). Next, in step 425, processing is started on the selected job. Next, in step 430, the AC frequency is checked. If the AC frequency is higher (or alternatively equal to) the threshold AC frequency the method proceeds to step 435 and processing continues without stopping. Next in step 440, it is determined if the job is complete. If the job is not complete the method loops back to step 430. Steps 430, 435 and 440 are performed periodically while the job is being processed. If in step 440, the job is complete, the method loop back to step 420 via connector "A."

Returning to step 430, if in step 430 the current AC frequency drops below the threshold AC frequency the method proceeds to step 445. In step 445 it is determined if the job can be stopped. If the job cannot be stopped, processing continues in step 435. If processing can be stopped the method proceeds to step 450, where the job processing is stopped and the job placed on hold. Next, in step 455 a decision is made if the current AC frequency does not exceed the threshold AC frequency to (1) relocate the job to an alternative site or (2) restart and complete the job with no further stoppages. Option (1) is not available for manufacturing jobs as performed by sites 100C and 100D of FIG. 3.

FIG. 6 includes an optional step 460 that is performed periodically. In step 460, jobs in queue are checked to see if they are exposed to missing a scheduled completion date/time. If a job is exposed, the exposed job is moved from job queue 410 to step 425 as soon as step 425 is available to receive the exposed job. Steps 400, 405, 415, 420, 425, 430, 435, 440, 445, 450, 455 and 460 are performed by or have instructions to do the action issued by the job dispatch unit.

Generally, the method described herein with respect to workload balancing for power grid management is practiced with a general-purpose computer and the methods described supra in the flow diagrams of FIGS. 4, 5 and 6 may be coded as a set of instructions on removable or hard media for use by the general-purpose computer.

Figure 7:
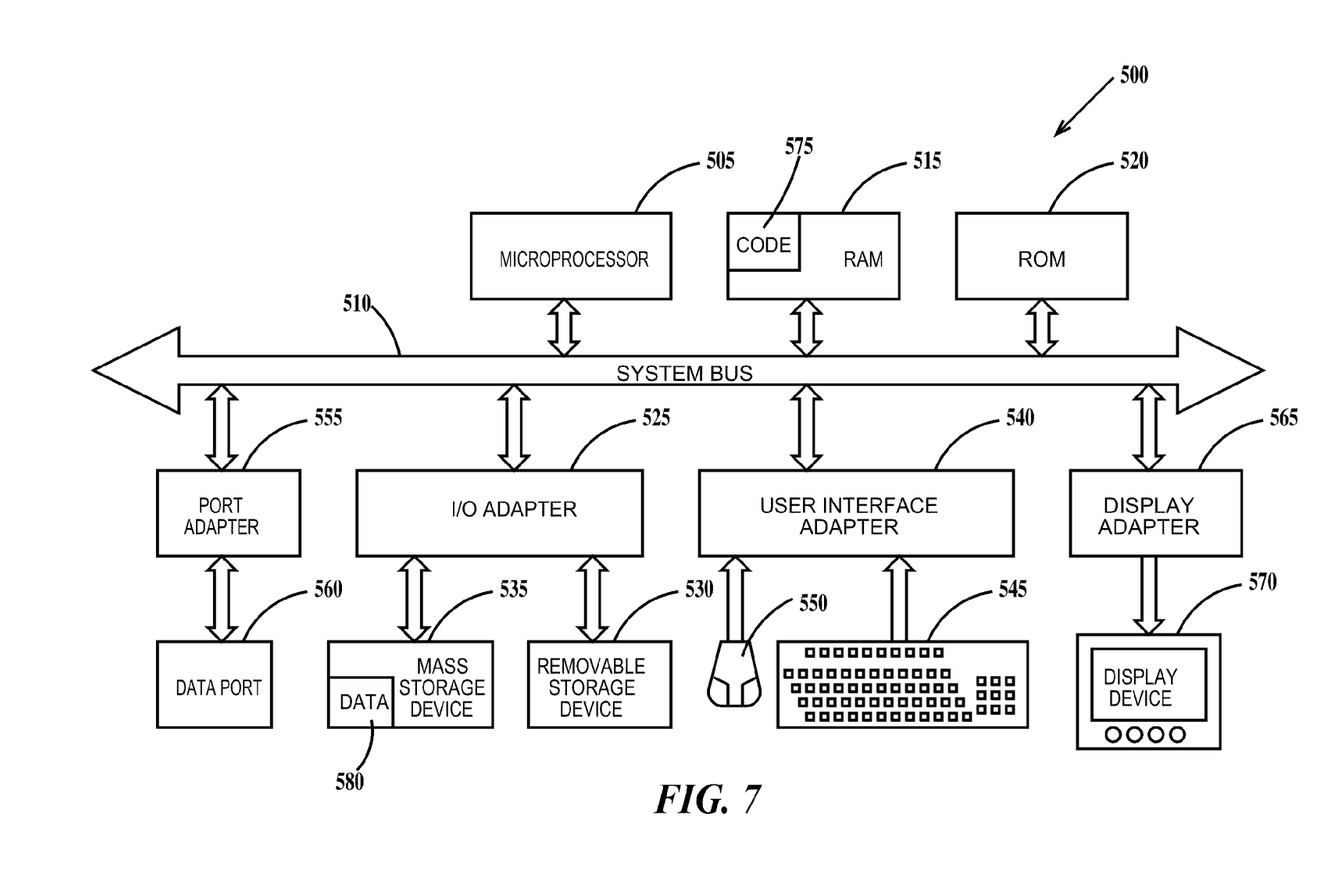
FIG. 7 is a schematic block diagram of a general-purpose computer.

FIG. 7 is a schematic block diagram of a general-purpose computer. In FIG. 7, computer system 500 has at least one microprocessor or central processing unit (CPU) 505. CPU 505 is interconnected via a system bus 510 to a random access memory (RAM) 515, a read-only memory (ROM) 520, an input/output (I/O) adapter 525 for a connecting a removable data and/or program storage device 530 and a mass data and/or program storage device 535, a user interface adapter 540 for connecting a keyboard 545 and a mouse 550, a port adapter 555 for connecting a data port 560 and a display adapter 565 for connecting a display device 570.

ROM 520 contains the basic operating system for computer system 500. The operating system may alternatively reside in RAM 515 or elsewhere as is known in the art. Examples of removable data and/or program storage device 530 include magnetic media such as floppy drives and tape drives and optical media such as CD ROM drives. Examples of mass data and/or program storage device 535 include electronic, magnetic, optical, electromagnetic, infrared, and semiconductor devices. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. In addition to keyboard 545 and mouse 550, other user input devices such as trackballs, writing tablets, pressure pads, microphones, light pens and position-sensing screen displays may be connected to user interface 540. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 530, fed through data port 560 or typed in using keyboard 545.

Thus, the embodiments of the present inventions provide methods and systems for workload balancing top assist in power grid management.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
  receiving a request to perform a task at a site powered by connection to an AC power grid, said task comprising either data processing or manufacturing an article;
  measuring an AC frequency of said AC power grid to obtain a current AC frequency;
  performing or not performing said task at said site based on said current AC frequency; and
  wherein said performing or not performing said task includes:
    if said current AC frequency is less than a threshold AC frequency, determining if an additional site powered by connection to an additional AC power grid has sufficient data processing or manufacturing capacity to perform said task;
    if said additional site has sufficient data processing or manufacturing capacity, then measuring an AC frequency of said additional AC power grid to obtain an additional current AC frequency; and
    if said additional current AC frequency is equal to or greater than an additional threshold AC frequency then transferring said task from said site to said additional site.

2. The method of claim 1, wherein said performing or not performing said task includes:
  performing said task at said site on a computer system or a manufacturing tool connected to said AC power grid if said current AC frequency is equal to or greater than a threshold AC frequency.

3. The method of claim 1, further including:
  after said transferring, performing said task at said additional site on an additional computer system or on an additional manufacturing tool connected to said additional AC power grid.

4. The method of claim 1, further including:
  if said additional site does not have sufficient data processing or manufacturing capacity or if said additional current AC frequency is less than said additional threshold AC frequency then determining if said task needs to be released for processing to meet a scheduled completion time and date and if said task needs to be released for processing to meet said scheduled completion date/time then performing said task at said site on a computer system or a manufacturing tool connected to said AC power grid.

5. The method of claim 1, wherein said threshold AC frequency is equal to or greater than a nominal AC frequency of said AC power grid and said additional threshold AC frequency is equal to or greater than a nominal AC frequency of said additional AC power grid.

6. The method of claim 1, further including:
  at an additional site powered by connection to an additional AC power grid, measuring an AC frequency of said additional AC power grid to obtain an additional current AC frequency;
  if said current AC frequency is higher than said additional current AC frequency, then performing said task at said site on a computer system or a manufacturing tool connected to said AC power grid; and
  if said additional current AC frequency is higher than said current AC frequency, then transferring said task to said additional site and performing said task at said additional site on a computer system or a manufacturing tool connected to said additional AC power grid.

7. The method of claim 6, further including:
  if said additional current AC frequency is higher than said current AC frequency, then transferring said task to said additional site only if said additional site has sufficient data processing or manufacturing capacity to perform said task.

8. The method of claim 7, further including:
  if said additional current AC frequency is higher than said current AC frequency, and said additional site does not have sufficient data processing or manufacturing capacity to perform said task, and said task needs to be released for processing to meet a scheduled completion time and date then performing said task at said site on said computer system or said manufacturing tool connected to said AC power grid.

9. A method, comprising:
  receiving a request to perform a task at a site powered by connection to an AC power grid, said task either comprising data processing or manufacturing an article;
  periodically measuring an AC frequency of said AC power grid to obtain a current AC frequency;
  starting said task at said site on a computer system or a manufacturing tool connected to said AC power grid when said current AC frequency is equal to or greater than a threshold AC frequency;
  after said receiving a request to perform a task, said periodically measuring an AC frequency of said AC power grid and said starting said task at said site, then periodically measuring an AC frequency of said AC power grid to obtain a periodic AC frequency and if said periodic AC frequency is lower than said threshold AC frequency then stopping said task and restarting said task from where said task was stopped when said periodic AC frequency is again greater than said threshold AC frequency;

while said task is stopped, determining if said task needs to be released for processing to meet a scheduled completion time and date; and if said task needs to be released for processing to meet said scheduled completion time and date, then restarting said task from where said task was stopped and completing said task with no further stoppages or transferring said task to an alternative site having the same capability to perform said task as said site, said alternative site completing performance of said task.

10. The method of claim 9, further including:

continuing to periodically measure said AC frequency of said AC power grid to obtain said periodic AC frequency and if said periodic AC frequency is lower than said threshold AC frequency then stopping said task and restarting said task from where said task was stopped when said periodic AC frequency is again greater than said threshold AC frequency until said task is complete.

11. A computer system comprising a processor, an address/data bus coupled to said processor, and a computer-readable memory unit coupled to communicate with said processor, said computer-readable memory unit containing instructions that when executed by the processor implement a method for workload balancing to assist in power grid load management, said method comprising the computer implemented steps of:

receiving a request to perform a task at a site powered by connection to an AC power grid, said task comprising either data processing or manufacturing an article;

determining a current AC frequency of said AC power grid from frequency measurements of said AC power grid;

issuing instructions to perform or not perform said task at said site based on said current AC frequency; and wherein the method step of issuing instructions to perform or not perform said task at said site based on said current AC frequency includes:

if said current AC frequency is less than a threshold AC frequency, issuing instructions to determine if an additional site powered by connection to an additional AC power grid has sufficient data processing or manufacturing capacity to perform said task;

if said additional site has sufficient data processing or manufacturing capacity, then determining an additional current AC frequency of said additional AC power grid from frequency measurements of said additional AC power grid; and if said additional current AC frequency is equal to or greater than an additional threshold AC frequency then issuing instructions to transfer said task from said site to said additional site.

12. The computer system of claim 11, wherein the method step of issuing instructions to perform or not perform said task at said site based on said current AC frequency includes:

issuing instructions to perform said task at said site on a computer system or a manufacturing tool connected to said AC power grid if said current AC frequency is equal to or greater than a threshold AC frequency.

13. The computer system of claim 11, the method further including:

said instructions to transfer said task from said site to said additional site further including additional instructions to perform said task at said additional site on an additional computer system or on additional manufacturing tool connected to said additional AC power grid.

14. The computer system of claim 11, the method further including:

if said additional site does not have sufficient data processing or manufacturing capacity or if said additional current AC frequency is less than said threshold AC frequency then determining if said task needs to be released for processing to meet a scheduled completion time and date and if said task needs to be released for processing to meet said scheduled completion time and date then issuing instructions to perform said task at said site on a computer system or a manufacturing tool connected to said AC power grid.

15. The computer system of claim 11, wherein said threshold AC frequency is equal to or greater than a nominal AC frequency of said AC power grid and an additional threshold AC frequency is equal to or greater than a nominal AC frequency of said additional AC power grid.

16. The computer system of claim 11, the method further including:

at an additional site powered by connection to an additional AC power grid, determining an additional current AC frequency of said additional AC power grid based on frequency measurements of said additional AC power grid;

if said current AC frequency is higher than said additional current AC frequency, then issuing instructions to perform said task at said site on a computer system or a manufacturing tool connected to said AC power grid; and if said additional current AC frequency is higher than said current AC frequency, then issuing instructions to transfer said task to said additional site and for said additional site to perform said task on an additional computer system or an additional manufacturing tool connected to said additional AC power grid.

17. The computer system of claim 16, the method further including:

if said additional current AC frequency is higher than said current AC frequency, then issuing instructions to transfer said task to said additional site only if said additional site has sufficient data processing or manufacturing capacity to perform said task.

18. The computer system of claim 17, the method further including:

if said additional current AC frequency is higher than said current AC frequency, and said additional site does not have sufficient data processing or manufacturing capacity to perform said task, and said task needs to be released for processing to meet a scheduled completion time and date then performing said task at said site on said computer system or said manufacturing tool connected to said AC power grid.

19. A computer system comprising a processor, an address/data bus coupled to said processor, and a computer-readable memory unit coupled to communicate with said processor, said computer-readable memory unit containing instructions that when executed by the processor implement a method for workload balancing to assist in power grid load management, said method comprising the computer implemented steps of:

receiving a request to perform a task at a site powered by connection to an AC power grid, said task either comprising data processing or manufacturing an article;

periodically determining a current AC frequency of said AC power grid based on frequency measurements of said AC power grid;

issuing instructions to start said task at said site on a computer system or a manufacturing tool connected to said AC power grid when said current AC frequency is equal to or greater than a threshold AC frequency;

after said receiving a request to perform a task, periodically measuring an AC frequency of said AC power grid and said starting said task at said site, then periodically measuring an AC frequency of said AC power grid to obtain a periodic AC frequency and if said periodic AC frequency is lower than said threshold AC frequency then stopping said task and restarting said task from where said task was stopped when said periodic AC frequency is again greater than said threshold AC frequency; and while said task is stopped, determining if said task needs to be released for processing to meet a scheduled completion time time and date and either:

if said task needs to be released for processing to meet said scheduled completion time and date, then issuing instructions to restart said task from where said task was stopped and completing said task with no further stoppages; or    if said task needs to be released for processing to meet said scheduled completion time and date and said task is a data processing task, then issuing instructions to transfer said task to an alternative site having the same capability to perform said task as said site and issuing instructions to said alternative site to complete performance of said task.

20. The computer system of claim 19, the method further including:

continuing to periodically measure said AC frequency of said AC power grid to obtain said periodic AC frequency and if said periodic AC frequency is lower than said threshold AC frequency then stopping said task and restarting said task from where said task was stopped when said periodic AC frequency is again greater than said threshold AC frequency until said task is complete.

* * * * *